(12) United States Patent
Cunningham et al.

(10) Patent No.: US 8,167,321 B2
(45) Date of Patent: May 1, 2012

(54) BINDING COMPONENTS FOR A GLIDING BOARD

(75) Inventors: Christopher C. Cunningham, Burlington, VT (US); Scott T. Keller, Waterbury, VT (US)

(73) Assignee: The Burton Corporation, Burlington, VT (US)

( * ) Notice: Subject to any disclaimer, the term of this patent is extended or adjusted under 35 U.S.C. 154(b) by 585 days.

(21) Appl. No.: 12/327,794

(22) Filed: Dec. 3, 2008

(65) Prior Publication Data

US 2010/0133786 A1 Jun. 3, 2010

(51) Int. Cl.
*A63C 9/00* (2006.01)

(52) U.S. Cl. .................. 280/14.24; 280/14.22

(58) Field of Classification Search .......... 280/624, 280/607, 618, 617, 623, 613, 620, 14.24, 280/14.22
See application file for complete search history.

(56) References Cited

U.S. PATENT DOCUMENTS

| | | | |
|---|---|---|---|
| 4,856,808 A * | 8/1989 | Longoni | 280/617 |
| 4,964,649 A | 10/1990 | Chamberlin | |
| 5,156,644 A | 10/1992 | Koehler et al. | |
| 5,409,244 A | 4/1995 | Young | |
| 5,413,371 A | 5/1995 | Trimble | |
| 5,417,443 A | 5/1995 | Blattner et al. | |
| D364,667 S | 11/1995 | Pacha | |
| 5,480,176 A | 1/1996 | Sims | |
| 5,553,883 A | 9/1996 | Erb | |
| 5,577,755 A | 11/1996 | Metzger et al. | |
| 5,584,492 A | 12/1996 | Fardie | |
| 5,586,799 A | 12/1996 | Kanemitsu et al. | |
| 5,660,410 A | 8/1997 | Alden | |
| 5,673,927 A | 10/1997 | Vermillion | |
| 5,695,210 A | 12/1997 | Goss et al. | |
| 5,762,358 A | 6/1998 | Hale | |
| 5,799,957 A | 9/1998 | Okajima et al. | |
| 5,806,876 A | 9/1998 | Alden | |
| 5,826,910 A | 10/1998 | Ricks et al. | |
| 5,853,188 A | 12/1998 | Alden | |
| 5,855,390 A * | 1/1999 | Hassell | 280/607 |
| 5,868,416 A | 2/1999 | Fardie | |
| 5,901,975 A * | 5/1999 | Phipps | 280/618 |
| 5,915,718 A * | 6/1999 | Dodge | 280/607 |
| 5,941,552 A | 8/1999 | Beran | |
| 5,947,488 A | 9/1999 | Gorza et al. | |
| 5,984,325 A | 11/1999 | Acuna | |
| 5,984,346 A | 11/1999 | Keller | |
| 6,015,161 A | 1/2000 | Carlson | |
| 6,022,040 A * | 2/2000 | Buzbee | 280/613 |
| 6,095,881 A | 8/2000 | Neubauer | |

(Continued)

FOREIGN PATENT DOCUMENTS

EP 0761261 A1 12/1997

(Continued)

OTHER PUBLICATIONS

Annex dated Dec. 4, 2010, International Application No. PCT/US2009/006364.

(Continued)

*Primary Examiner* — J. Allen Shriver, II
*Assistant Examiner* — Emma K Frick

(57) ABSTRACT

A snowboard binding and hold-down device that may flex or move with the snowboard when ridden to minimize any impact on flex characteristics. The snowboard binding may be compatible with a variety of snowboard binding mount arrangements.

22 Claims, 8 Drawing Sheets

U.S. PATENT DOCUMENTS

| | | | |
|---|---|---|---|
| 6,102,429 | A | 8/2000 | Laughlin et al. |
| 6,123,354 | A | 9/2000 | Laughlin et al. |
| 6,189,899 | B1 | 2/2001 | Carlson |
| 6,189,911 | B1 | 2/2001 | Caron et al. |
| 6,270,110 | B1 | 8/2001 | Laughlin et al. |
| 6,283,491 | B1 | 9/2001 | Bush et al. |
| 6,347,805 | B1 | 2/2002 | Maravetz et al. |
| 6,357,783 | B1 | 3/2002 | Okajima et al. |
| 6,428,032 | B1 * | 8/2002 | Humbel .................... 280/613 |
| 6,457,736 | B1 | 10/2002 | Maravetz et al. |
| 6,461,210 | B2 | 10/2002 | Lorenzo |
| 6,557,866 | B2 | 5/2003 | Jones et al. |
| 6,666,472 | B2 | 12/2003 | Joubert Des Ouches |
| 6,676,152 | B2 | 1/2004 | Gonthier |
| 6,783,146 | B1 | 8/2004 | Coing |
| 6,824,159 | B2 | 11/2004 | Okajjima et al. |
| 6,905,133 | B2 | 6/2005 | Lett |
| 6,910,706 | B2 | 6/2005 | Holzer et al. |
| 6,916,036 | B1 * | 7/2005 | Egli ........................... 280/618 |
| 7,073,814 | B2 | 7/2006 | Okajima et al. |
| 7,097,195 | B2 | 8/2006 | Orr et al. |
| 7,134,928 | B1 | 11/2006 | Cannon |
| 7,270,337 | B1 * | 9/2007 | Carotenuto ............... 280/14.24 |
| 7,290,785 | B2 | 11/2007 | Dixon |
| 7,300,070 | B2 | 11/2007 | Pelchat |
| 7,334,810 | B2 | 2/2008 | Holzer et al. |
| 7,490,859 | B2 * | 2/2009 | Coing ........................ 280/817 |
| 2002/0024187 | A1 * | 2/2002 | Gyr ............................ 280/14.22 |
| 2003/0011171 | A1 | 1/2003 | Battistella |
| 2003/0090072 | A1 * | 5/2003 | Cole, III ................... 280/14.24 |
| 2003/0178812 | A1 * | 9/2003 | Schaller et al. ............ 280/618 |
| 2004/0145155 | A1 | 7/2004 | Martin et al. |
| 2005/0042954 | A1 | 2/2005 | Pacha |
| 2005/0048853 | A1 | 3/2005 | Pacha |
| 2005/0051997 | A1 | 3/2005 | Okajima et al. |
| 2005/0062260 | A1 | 3/2005 | Elkington et al. |
| 2006/0087089 | A1 | 4/2006 | Okano et al. |
| 2006/0119054 | A1 * | 6/2006 | Kunz et al. ................. 280/14.22 |
| 2006/0197310 | A1 * | 9/2006 | Fletcher ..................... 280/607 |
| 2006/0273550 | A1 | 12/2006 | Delago |
| 2006/0290105 | A1 | 12/2006 | Coing |
| 2006/0292944 | A1 | 12/2006 | Cumrine |
| 2007/0029759 | A1 * | 2/2007 | O'Hara ....................... 280/618 |
| 2007/0187911 | A1 | 8/2007 | Morley |
| 2010/0133786 | A1 * | 6/2010 | Cunningham et al. ...... 280/623 |

FOREIGN PATENT DOCUMENTS

| | | |
|---|---|---|
| EP | 1005883 A1 | 6/2000 |
| FR | 2772625 A1 | 6/1999 |
| FR | 2 899 820 A1 | 10/2007 |
| JP | 08-257201 | 10/1996 |
| WO | WO 9941130 A1 | 8/1999 |
| WO | WO 9941139 A1 | 8/1999 |

OTHER PUBLICATIONS

International Search Report from PCT/US2009/006364, mailed Jun. 23, 2010.

Hyperlite Platinum Claw Hyperlok Mount Kit 2008, printed May 1, 2008.

Hyperlite Era Wakeboard Boots 2008, printed May 1, 2008.

* cited by examiner

BINDING COMPONENTS FOR A GLIDING BOARD

BACKGROUND

The feel of a snowboard, as perceived by a rider, may be determined at least in part by how the snowboard flexes. Various riding styles and terrain conditions may also recommend a particular type of board flex. With this in mind, a snowboard may be designed with a particular flex pattern.

Snowboard bindings secure a rider to the snowboard, and typically are in the form of a rigid baseplate that receives the rider's boot and a rigid hold-down disk that is received in, and attaches, the baseplate to the snowboard (known as a "tray" style binding). The rigid hold-down disc is provided with openings or slots that are compatible with a pattern of threaded inserts (e.g., "4×4" or 3D (TRADEMARK)) arranged on the snowboard. Fasteners are passed through the hold down disc and screwed into the inserts, attaching the baseplate to the board. The rigidity of both the baseplate and the hold-down disc may create a dead spot that resists flexing of the snowboard underneath and/or adjacent the binding.

In contrast to tray style bindings, 'baseless' bindings do not include a floor or base so that a rider's boot rests directly on the snowboard. Baseless bindings are believed to allow greater board flex as compared to tray style bindings. An example of a baseless binding is described in US Patent Application Publication No. 2008/0030000 A1, assigned to The Burton Corporation, which is the assignee of the present application. In that particular baseless binding, fastener mounts are located external of the binding sidewalls (that is, not in the foot-receiving area of the binding), and the binding is configured for mounting to a channel style binding interface in the snowboard. The baseless binding described in the published patent application is not compatible with a snowboard configured with a 4×4 or 3D (TRADEMARK) insert pattern.

SUMMARY

Aspects of the invention relate to a binding that when mounted to a gliding board, facilitates bending of the board at and/or near the binding location. According to certain embodiments, a binding has medial and lateral base regions that move in concert with outwardly bowed (e.g., convex) bending of the gliding board. One or both of the base and a hold-down device used to secure the base to the gliding board, may be arranged to allow first and second portions of the base of the binding to pivot or otherwise move towards one another.

According to one aspect, a hold-down device is provided for mounting a binding base to a gliding board that includes a first rigid hold-down portion that is arranged to mount to a complimentary hold-down portion receiving area of a binding base, and a second rigid hold-down portion that is arranged to mount to a complimentary hold-down portion receiving area of a binding base. A flexible connection is provided between the first rigid hold-down portion and the second rigid hold-down portion, such that the first rigid hold-down portion and the second rigid hold-down portion are moveable relative to one another in response to bending forces of a gliding board when each of the first and second rigid hold-down portions mount a binding base to a gliding board.

According to another aspect, a hold-down device is provided for mounting a binding base to a gliding board that includes a first rigid hold-down portion and a second rigid hold-down portion that are each arranged to mount to a complimentary hold-down portion receiving area of a binding base. The first rigid hold-down portion includes a central portion and a binding base engagement feature for resisting binding distortion that faces towards the central portion, and the second rigid al hold-down portion includes a central portion and a binding base engagement feature for resisting binding distortion that faces towards the central portion.

According to another aspect a hold-down device is provided for mounting a binding base to a gliding board that includes first and second rigid hold-down portions that are arranged to mount to a complimentary hold-down portion receiving area of a binding base at a plurality of different angular positions relative to the binding base. The hold-down device is provided with at least one rotational stop that is cooperable with a rotational stop of a binding base to limit an angular position of the binding base relative to the hold-down device.

According to another aspect, a hold-down device is provided for mounting a binding base to a gliding board that includes a rigid medial hold-down portion that is arranged to mount to an inner medial region of a binding base and that includes at least one opening or slot arranged to receive a fastener to mount the rigid medial hold-down portion to a gliding board, and a rigid lateral hold-down portion that is arranged to mount to an inner lateral region of a binding base and that includes at least one opening or slot arranged to receive a fastener to mount the rigid lateral hold-down portion to a gliding board. A plurality of teeth extend along an arc on each of the rigid medial hold-down portion and the rigid lateral hold-down portion that are engageable to corresponding teeth of an inner medial region and an inner lateral region, respectively, of a binding base in one of a plurality of different angular positions. A hinge connects the rigid medial hold-down portion and the rigid lateral hold-down portion such that, when the hold-down device has mounted a binding base to a gliding board, the rigid medial hold-down portion and the rigid lateral hold-down portion are moveable relative to one another in response to bending forces of the gliding board.

According to another aspect, a binding base for a gliding board is provided including a medial region having a medial side wall and a medial base portion, and a lateral region having a lateral side wall and a lateral base portion. Each of the medial base portion and the lateral base portion are positioned between the medial side wall and the lateral side wall and together define a hold-down device mounting area wherein the lateral base portion and the medial base portion are interrupted so as to be separate and spaced from each other. The medial and lateral base portions each include a plurality of teeth engageable to complementary teeth on a hold-down device so that the binding base is mountable to a hold-down device in one of a plurality of different angular positions relative to the hold-down device. A hold-down device engagement feature, for resisting distortion of the binding base, is located on the medial base portion and faces toward the medial side wall, and a hold-down device engagement feature, for resisting distortion of the binding base, is located on the lateral base portion and faces toward the lateral side wall.

According to another aspect, a binding base for a gliding board is provided, including a medial region having a medial side wall and a medial base portion, and a lateral region having a lateral side wall and a lateral base portion. Each of the medial base portion and the lateral base portion are positioned between the medial side wall and the lateral side wall and together define a hold-down device mounting area wherein the lateral base portion and the medial base portion are interrupted so as to be separate and spaced from each other. The medial and lateral base portions each include a plurality of teeth engageable to complementary teeth on a hold-down device so that the binding base is mountable to a hold-down device in one of a plurality of different angular positions relative to the hold-down device. The binding base includes at least one rotational stop to engage a corresponding rotational stop of a hold-down device to limit the angular position of the binding base relative to the hold-down device.

In a still further aspect, a binding for a gliding board is provided including a binding base having a medial sidewall and a lateral sidewall, and a medial base portion and a lateral base portion. Each of the medial base portion and the lateral base portion are positioned between the medial side wall and the lateral side wall and together define a hold-down device mounting area wherein the lateral base portion and the medial base portion are interrupted so as to be separate and spaced from each other. A hold-down device is arranged for receipt in the hold-down device receiving area for mounting the binding base to a gliding board. The hold-down device includes a medial portion and a lateral portion, and a flexible connection between the medial portion and the lateral portion. The medial and lateral base portions each include a plurality of teeth engageable to complementary teeth on the medial and lateral portions of the hold-down device in a plurality of angular positions of the binding base relative to the hold-down device. The medial base portion and the lateral base portion are moveable relative to one another, when the hold-device mounts the binding base to a gliding board, in response to bending forces of the gliding board.

These and other aspects of the invention will be appreciated from the following description and claims.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
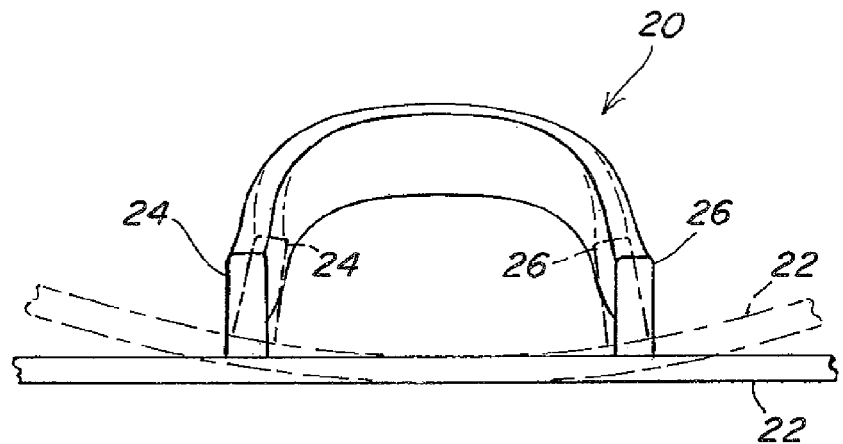
FIG. 1 is a schematic view of a binding, according to certain embodiments, that shows medial and lateral base regions of a binding moving about a heel-toe axis.

Aspects of the present invention relate to a binding, a baseplate for a binding, and a hold down disc for a binding, (each of the preceding may individually and collectively be referred to herein as "binding components") to be mounted to a gliding board and that are constructed and arranged to facilitate bending of a gliding board relative to the location of the binding components. The binding, baseplate for a binding, and hold down disc for a binding may, additionally or alternatively, be arranged to resist unwanted distortion when a gliding board including the binding components is ridden.

In one illustrative embodiment, a rigid binding includes a foot-receiving area that is positioned between medial and lateral sidewalls. The foot-receiving area may be in the form of a rigid base, and may further include a rigid hold-down device received in an aperture in the rigid base for mounting the base to the gliding board. The binding base may be characterized by medial and lateral base regions that, when the binding has been secured via the hold-down device to the gliding board, are moveable (e.g., pivotable) relative to one another in response to flexing forces of the gliding board. The moveable arrangement of the medial and/or lateral regions mitigates resistance of the rigid binding to the bending of the gliding board. Either or both of the hold-down device and/or the base may be configured to facilitate movement of the medial and lateral base regions in response to outward curving of the board, or other forces acting on the gliding board.

According to some aspects, a binding for a gliding board includes a base having medial and lateral regions that are spaced from one another along an intermediate portion of the binding to define a hold-down device mounting area. The medial and lateral regions at the intermediate portion are interrupted, so that a gap extends completely between the medial and lateral regions in the hold-down device mounting area. A hold-down device cooperates with the base, and has first and second portions that are configured to move relative to one another in response to bending forces of a board to which the binding is mounted. The hold-down device may be a single unit formed of a unitary construction, or consist of two or more components that cooperate together. Alternatively, the hold-down device may include independent, separate components that are arranged to cooperate together when mounted to a gliding board.

According to some aspects, a binding, a baseplate for a binding, and/or a hold-down device for a binding, may be configured to resist unwanted binding distortion such as parallelogramming, (i.e., medial and/or lateral regions rotating on an upper surface of a board or moving oppositely/relative to one another in the heel-toe direction of the binding) and/or bowing (i.e., portions of the medial and lateral regions moving away from one another). Although not limited to a binding that is configured to minimize resistance to bending forces of a gliding board, such a binding may particularly be susceptible to unwanted distortion. A binding may include a bridge, such as at the front end of the binding, that connects medial and lateral regions of the binding to resist unwanted distortion. Additionally or alternatively, an interface may be provided between a hold-down device and a binding base to resist parallelogramming and/or bowing. According to some aspects, a binding may include an integral base and hold down arrangement or, instead, may include a base and a separate hold-down device for securing the base to a gliding board.

For purposes herein, "gliding board" refers generally to any board type structure, as well as to other devices, which allow a rider to traverse a surface. Some non-limiting examples of a gliding board include a snowboard, snow skis, water skis, wake board, kite board, surfboard and the like. For ease of understanding, however, and without limiting the scope of the invention, aspects of the invention are discussed herein in connection with a snowboard.

It also is to be appreciated that the term "hold-down device" refers generally to a component of a binding that may be used to secure the binding to a gliding board. Although referred to as a hold-down disc, in some embodiments discussed herein, it is to be appreciated that the hold-down device may take other overall shapes and, consequently, the hold-down device is not limited to being disc-shaped, nor to constituting a component that is separate from the binding base.

It also is to be appreciated that a binding for a snowboard may include a strap type binding (also known as a tray binding) having one or more of a toe strap, an instep strap and a shin-strap, a step-in binding, hybrid strap/step-in bindings, and other arrangements for retaining a rider's boot to a snowboard. Further, any of the foregoing snowboard bindings may include a highback and, additionally, a forward lean adjuster for limiting the forward lean of the highback. Aspects of the invention are not limited to any particular style of binding, whether or not expressly described herein. Further, a binding may be configured for compatibility with a snowboard having a channel-type mounting arrangements, a 4×4 fastener insert pattern, a 3D (TRADEMARK) fastener insert pattern, as well as other binding interface systems as should be apparent to one of skill in the art.

Figure 2A:
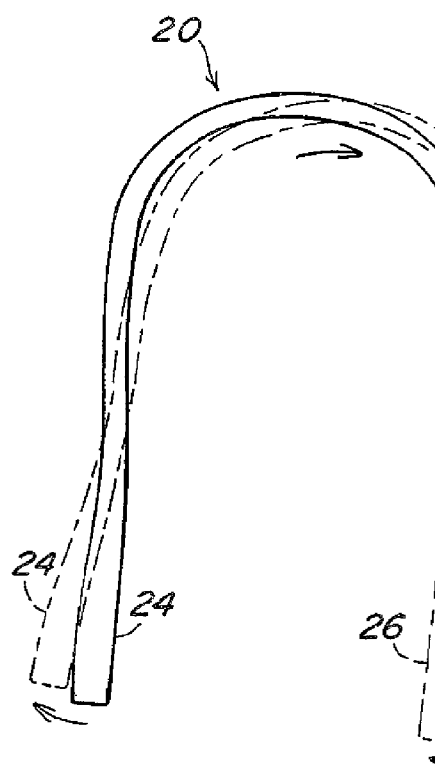
FIG. 2A is a schematic view of an unwanted binding distortion known as 'paralellogramming'.
Figure 2B:
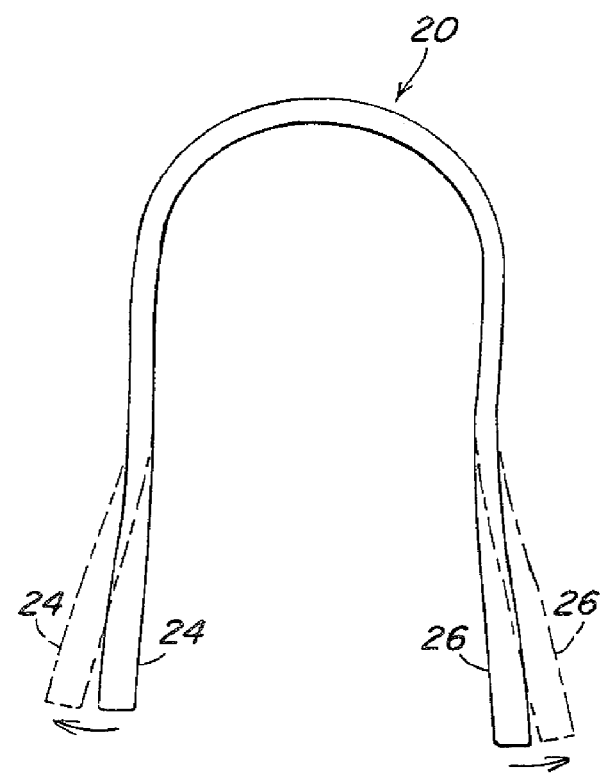
FIG. 2B is a schematic view of an unwanted binding distortion referred to as 'bowing'.

FIG. 1 is a schematic view, somewhat exaggerated, of a rigid binding 20 that is configured to facilitate flex of a snowboard despite the presence of the rigid binding. The binding 20 and snowboard 22 are illustrated both in an un-flexed state (represented by solid lines) and a flexed state (represented by dashed lines). As represented, the board 22 curves beneath and adjacent to the binding as medial and lateral base regions 24, 26 of the binding 20 move, relative (e.g., pivot) to one another in response to board flex. This movement may be characterized about an axis that extends substantially in a heel-toe direction of the binding base (i.e., that extends into and out of the page in FIG. 1). When a binding is mounted perpendicular to the axis of snowboard (i.e., 0 degree stance angle), the pivot axis of the hold down device and the axis of the binding base coincide. Many riders mount one or both bindings at an angle to the board axis, and may have front and rear bindings at different stance angles. When the pivot axis of the hold down device and the axis of the binding base are not coincident, there will still be movement of the binding base about the binding axis in response to outward bending forces of the board, although such movement may not be the same as when the binding axis coincides with the pivot axis of the hold-down disc. Certain types of unwanted distortion of a binding are represented schematically in FIGS. 2A and 2B, where the solid lines represent medial and lateral regions 24, 26 of a binding in an undistorted state and the dashed lines represent various distorted states. Parallelogramming, which may include medial and/or lateral regions rotating on an upper surface of a board or moving oppositely/relative to one another in the heel-toe direction of the binding, is represented by the dashed lines shown in FIG. 2A. The dashed lines in FIG. 2B represent a type of bowing, which includes toe end portions 28 of the medial and lateral regions moving away from one another. It is also to be appreciated that bowing may include central portions and/or heel end portions of the medial and lateral regions spreading away from one another.

Figure 3:
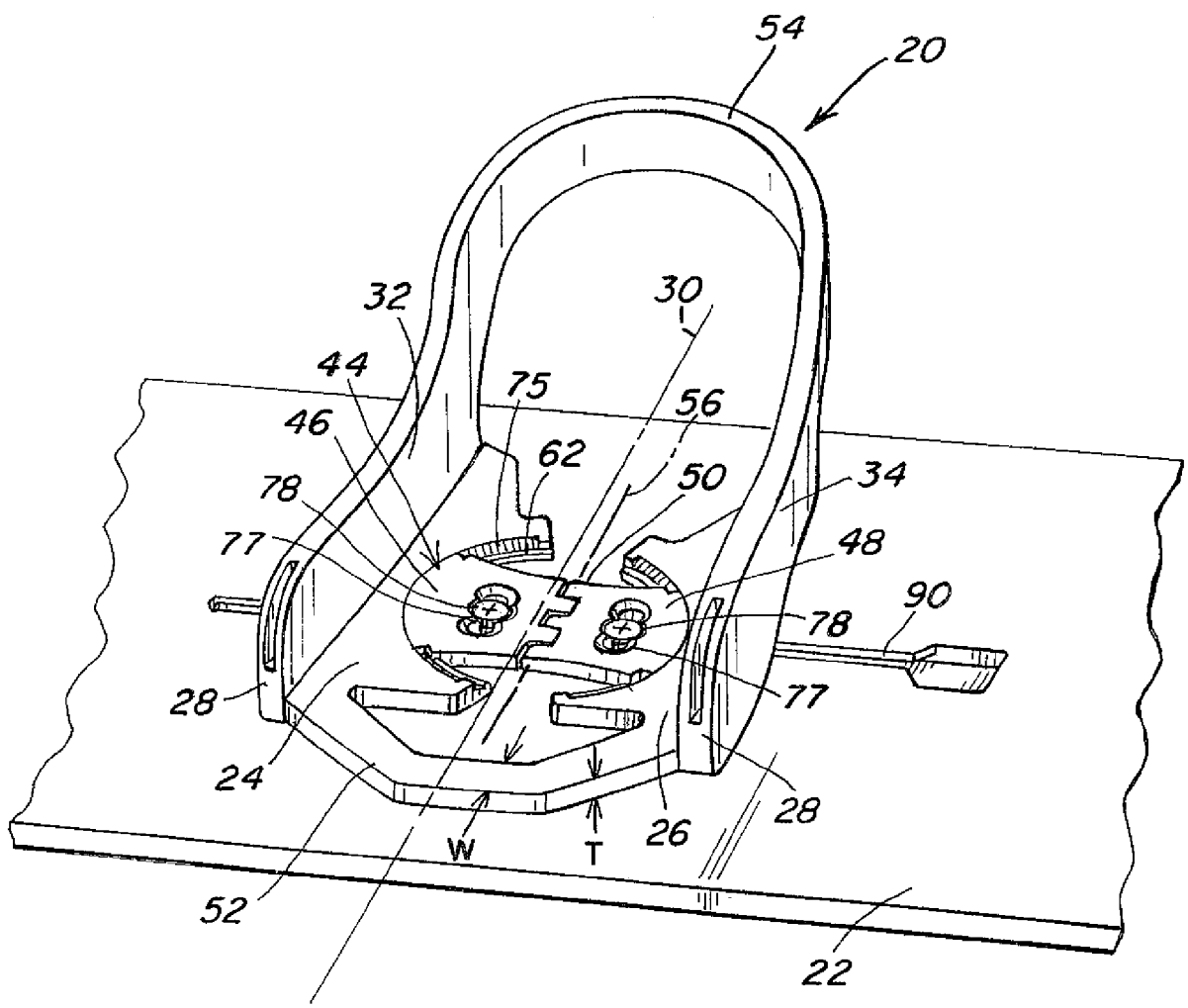
FIG. 3 is a perspective view of a binding, according to one embodiment, mounted to a snowboard that has a channel-type binding interface
Figure 4:
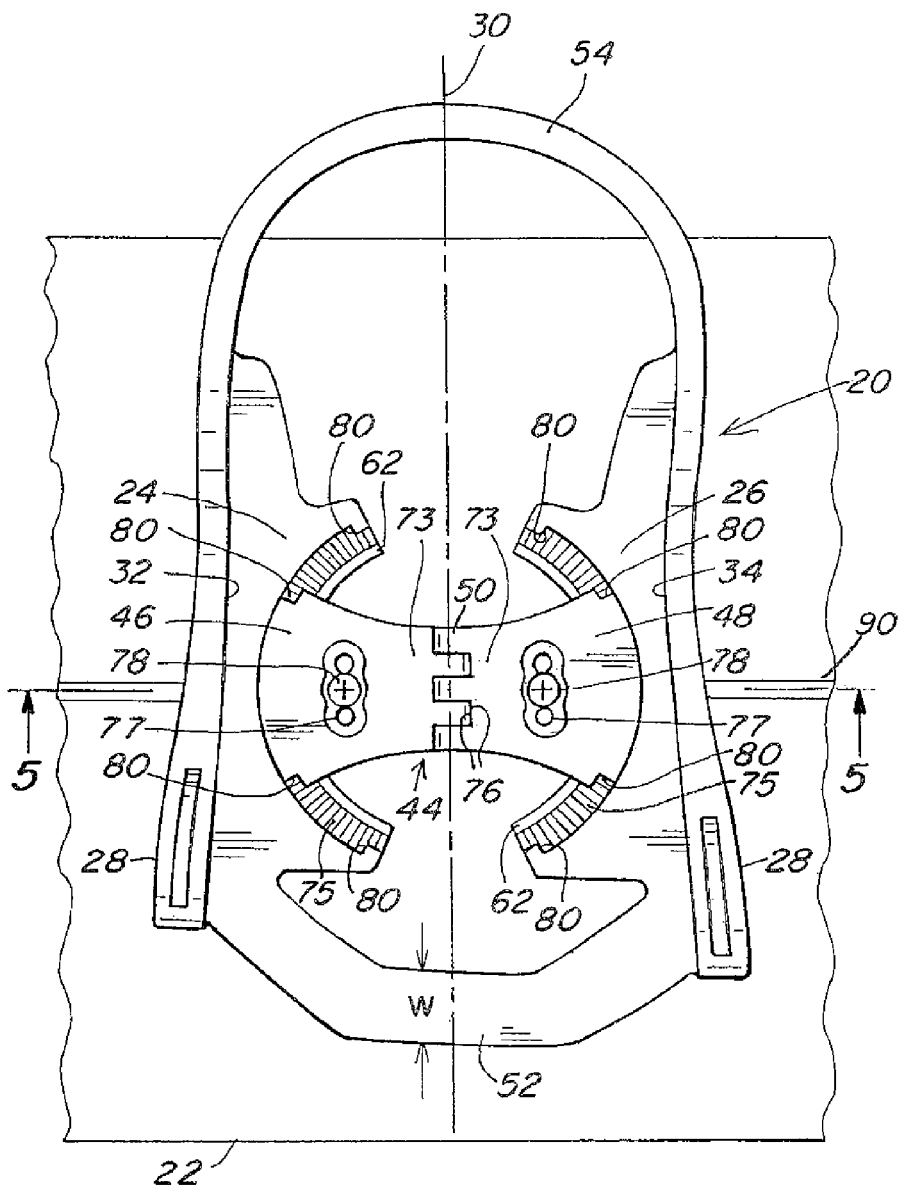
FIG. 4 is a plan view of the binding of FIG. 3.

FIGS. 3 and 4 show a binding 20 that includes a baseplate characterized by medial and lateral base regions 24, 26 and medial and lateral sidewalls 32, 34. The base regions are arranged to move relative to one another (e.g., flex or pivot) about a heel-toe axis 30, at least in part by having a gap or separation between the two regions at the hold-down device receiving area. As observed earlier, the hold-down disc receiving aperture in a conventional tray binding, in contrast, is completely surrounded by base material that extends from one sidewall to the other providing an uninterrupted rigid base or floor between the sidewalls that resists relative flexing of the medial and lateral base portions. The base is secured to a snowboard 22 by a hold-down device 44 having openings or slots 77 for receiving fasteners or other hardware for attaching to a binding interface in the snowboard, such as fastener inserts or a t-nut captured in a channel 90. The hold-down device has first and second portions 46, 48 that are connected by a hinge 50. The hinge allows the first and second portions 46, 48 of the hold-down device 44 to move in response to bending forces of the board away from the binding (i.e., outwardly). The rear, or heel end, of the binding base may be open, as shown, or otherwise arranged to permit inward flexing of the medial and lateral base regions in response to bending of the board. Other configurations of binding components that facilitate bending of a snowboard when a binding is mounted thereto are contemplated, certain of such other arrangements being described herein in greater detail.

Configuring the base to facilitate board flexing, as compared to tray style bindings, such as by interrupting the base at the hold-down device receiving area, and at locations rearwardly and forwardly thereof, may render the binding susceptible to parallelogramming or bowing. The medial and lateral base regions at the toe end, or front, of the binding shown in FIGS. 3 and 4 may be connected to one another by a bridge 52 that may be configured to resist unwanted binding distortion. The bridge 52 resists movement of the toe ends 28 away from one another, thus resisting bowing type of distortion. A binding may include one or more bridges that connect medial and lateral base regions to one another to resist bowing at the toe end, heel end, central portions of the binding, and at other locations as well as combinations of any of the foregoing.

According to some embodiments, a bridge may be constructed to allow medial and lateral base regions to flex towards one another, while still resisting unwanted distortion. Certain embodiments of a bridge may be constructed to flex more readily about an axis extending in the heel-toe direction of the binding than in other directions, such as about a vertical axis of the binding (as taken when ridden) that is associated with parallelogramming. This is accomplished in the embodiment of FIG. 3 by having the thickness T of the bridge 52 smaller than a width W of the bridge. Also, the bottom of the bridge may be located above the bottom of the base region as is illustrated. According to one embodiment, the bridge 52 may have a thickness of about 5 mm and a width of about 20 mm (a ratio of about 1:4), although other widths, thicknesses, and ratios are also possible. It is to be appreciated that a bridge may be constructed to be more flexible about a heel-toe axis than in other directions through other approaches, such as by being made of composite that is oriented to allow flexing about a heel-toe axis to a greater degree than about axes in other directions. Additionally or alternatively, other features may be incorporated into a bridge to allow movement like that shown in FIG. 1, including inclusion of a pinned hinge, living hinge or other flexible connections that may allow movement about the heel-toe axis yet resist bending in other directions. It is also to be appreciated that certain binding base embodiments may lack a bridge altogether.

A heel hoop 54, according to some embodiments, may also resist unwanted distortion. This may be accomplished with a heel hoop that flexes more readily about a heel-toe axis of the binding base than in other directions. A heel hoop may be constructed with a thickness T that is less than a width W to allow binding movement as shown in FIG. 1. Additionally or alternatively, a flexible arrangement, such as a pinned hinge, living hinge, expansion joint, compression joint, and the like, may be incorporated into a heel hoop.

The binding 20 illustrated in FIGS. 3-6B includes a hold-down device 44 that secures the binding 20 to a board 22. As shown, the hold-down device 44 includes first and second portions 46, 48 (for appropriate applications the first and second portions may be referred to herein as medial and lateral portions). The first and second portions are flexibly connected to one another, such as at a central area 73 as shown, by a hinge that has a pivot axis 56. Other types of flexible connections, other than a hinge, also are contemplated, certain of which arrangements are discussed herein. Each of the first and second portions 46, 48 has a hole, set of holes 77, one or more slots, or a combination thereof, for receiving at least one threaded fastener 78 to secure the hold-down device 44 and, consequently, a binding base 20 nested thereto to a board 22. Multiple holes, such as the three holes 77 shown in each of the first and second portion 46, 48, or slots, allow selective positioning of the hold down device and, consequently, the binding base relative to the edge of the snowboard. An outer edge 64 of each first and second portion 46, 48 includes a hook-shaped base engagement feature 60. The lower face 65 of the hook-shaped feature 60, which is positioned above a bottom surface 67 of the hold-down device 44, may include a plurality of teeth 74 that mesh with corresponding teeth 75 on the binding base 20 to secure the binding base and hold-down device together in one of a plurality of different angular orientations. A portion 61 of the hook-shaped feature faces toward the central area 73 of the device and may contact a corresponding hold-down device engaging feature 62 of the binding base (a protrusion in the embodiment of FIGS. 3-6B, when mounted thereto. An arcuate groove 70 is defined in a lower surface of the hold-down device by the hook-shaped feature. Portions of the outer edge 64 of each of the first and second portions extend further in a direction radially away from the central area 73, such that the outer edge defines a pair of shoulders that act as rotational stops 80 that may engage corresponding stops on the binding base 20.

As mentioned above, the hold-down device 44 may include first and second portions 46, 48 that can move towards one another in response to outward curving forces of a board. In the embodiment of FIGS. 3-6B, a hinge 50 connects the first and second portions 46, 48. The hinge, as shown, includes a pivot axis 56. The hold-down device may have a tip-to-tail direction and an edge-to-edge direction, with the pivot axis 56 arranged along either direction (shown extending along edge-to-edge direction), or in any other direction suitable for the particular application. The hold-down device 44 is not limited to the hinge 50 arrangement shown and other mechanisms allowing movement of the first and second portions are contemplated including, without limitation, a living hinge that connects the first and second portions (for example, metal first and second portions that are held together by an over-molded plastic), a tether that connects first and second portions, one or more ball and socket joints, a telescoping joint that guides the first and second portion in movement toward one another, and other types of joints. Additionally or alternatively, a hold-down device may include two or more portions that are independent from one another, as not all embodiments include a flexible connection.

Figure 5:
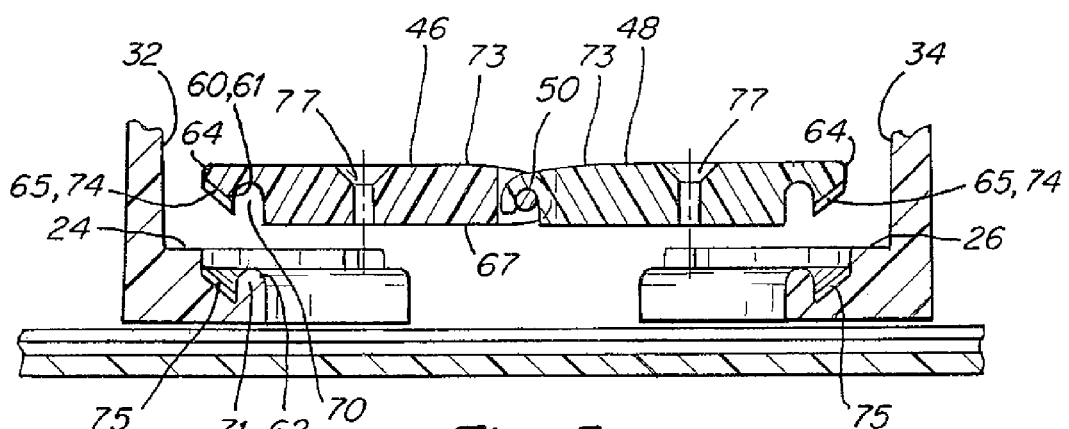
FIG. 5 is an exploded cross-sectional view of the binding of FIGS. 3 and 4, taken along line 5-5 of FIG. 4.
Figure 6A:
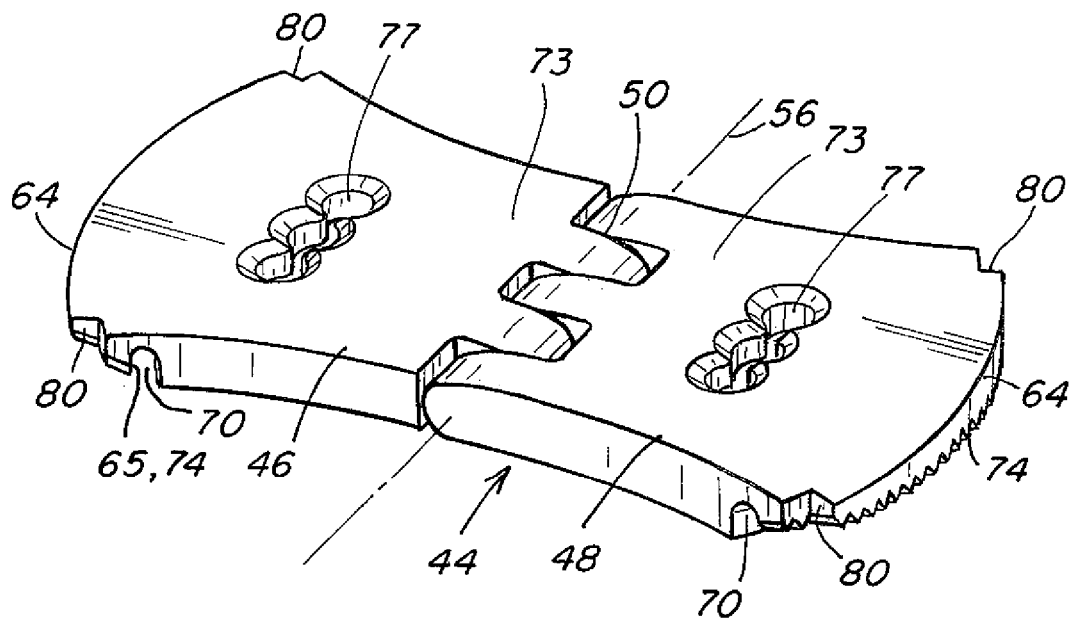
FIG. 6A is a perspective top view of the hold-down device of FIG. 3.
Figure 6B:
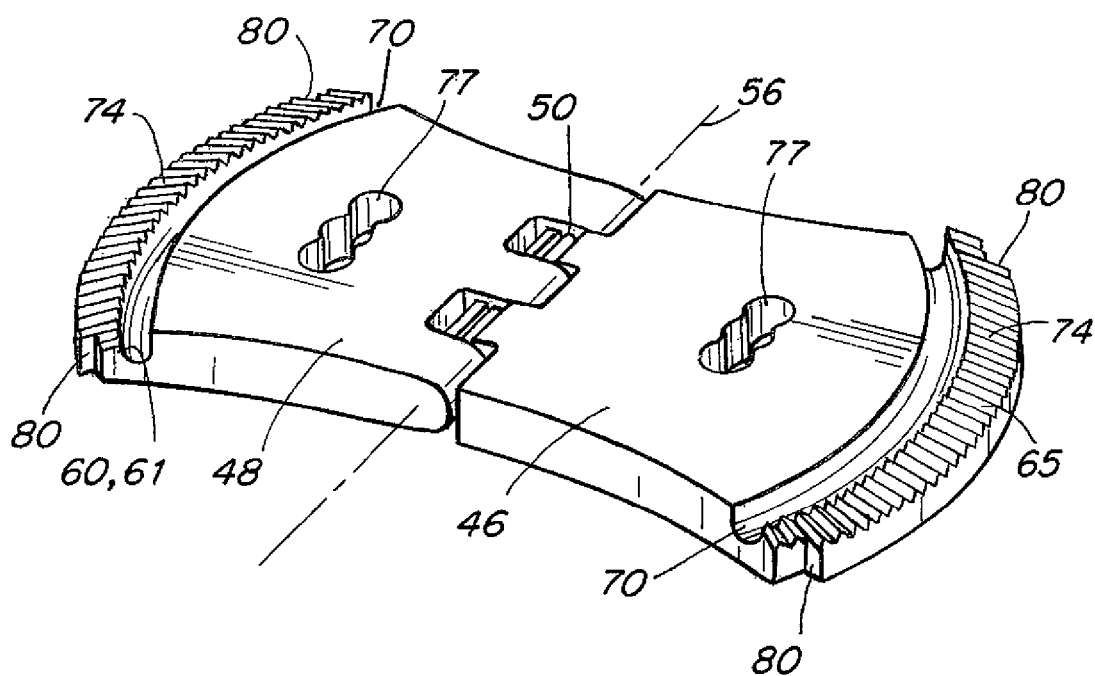
FIG. 6B is a perspective bottom view of the hold-down device of FIG. 3.

In certain embodiments, stance angle adjustment of the binding base relative to the hold down disc and, ultimately relative to the axis of the snowboard may be provided. A plurality of teeth 74 on the hold-down device are engageable with corresponding teeth 75 of the base region of a binding base, allowing the binding base to be rotated to a desired stance angle and maintained at that position when the fastener hardware is engaged to the inserts or other binding interface in the board. As shown in FIG. 6B, the plurality of teeth may be positioned on an underside 65 of a hook-shaped feature 60 and may extend along an arc on the hold down device (and corresponding base plate regions) to allow engagement at different rotational positions. In the embodiment of FIGS. 3-6B, the plurality of teeth 74 are inclined outwardly away from a central area of the hold down device, although other orientations are also possible, including vertical orientations, horizontal orientations, and teeth angled to different degrees or in different directions. The surface of the hold-down device may include angle indication marks to indicate an orientation of a snowboard binding base relative to the hold down disk. As illustrated, the hold-down device may include a body portion provided with two or more openings or slots for receiving fasteners for attaching the hold-down device to the gliding board. The plurality of angular adjustment teeth may be provided on a lip extending outwardly away from the body portion. The lip may include a vertical, horizontal, inclined, or curved surface that supports the plurality of teeth. Further, the first and second hold down portions together, in certain embodiments have an hourglass configuration. That is, a wider outer edge, which may curve as shown, and a narrower central region or waist, such as at the pivot axis of the hold-down device.

A hold-down device and a binding base may be particularly arranged to resist certain types of binding distortion and/or movement, including bowing and/or parallelogramming. As shown in FIGS. 5, 6A, and 6B, a medial hold-down portion 46 includes a base engagement feature 60, such as a hook, that faces away from a medial outer edge of the hold-down device 44, or in other words, faces toward a central area 73 of the hold-down device 44. A complimentary hold-down device engagement feature 62 of the base may, in turn, face toward the medial sidewall 32 of the binding. Engagement between the face 61 of the hook-shaped feature 60 and a hold-down device engaging feature 62 of the binding base 20 (which may also be a hook) may resist regions of the binding base from moving away from the central area 73, when mounted thereto. In this respect, bowing as depicted in FIG. 2A, may be resisted. The hook-shaped feature 60 shown in the embodiment of FIGS. 3-6B extends about a constant radius of curvature, and in this respect, provides resistance to bowing in all rotational orientations of the binding base relative to the hold down device. It is to be appreciated that complimentary base/hold-down device engaging features may be constructed in other ways, as the embodiment of FIGS. 3-6B is not limiting. By way of example, in some embodiments a plurality of receptacles and protrusions (for example, pegs and holes) may be positioned on complimentary engaging surfaces of the hold-down device and base, and may be configured to interlock the binding base and hold-down device to one another in different angular orientations. This distortion resisting feature may be provided in some or all stance angle positions of the binding base relative to the hold down device.

Collectively, interaction of the teeth 74, 75 and the engagement features 60, 62 may effectively lock the binding base regions to corresponding portions of the hold-down device. That is, the combination of teeth 74 and binding engagement features 60 on a portion of the hold-down device 44 may be positioned to collectively resist motion of a binding base region in multiple directions or all directions. By way of example, engagement between teeth 74, 75 resists rotation between a binding base region and a portion of the hold-down device. Interaction with the hook-shaped feature 60 (or other binding base engagement feature) may resist the binding base region from moving away or toward the corresponding portion of the hold-down device and/or from moving in a heel-toe direction of the binding. Engaging the binding base regions to the hold-down device portions in this manner may resist unwanted distortion as shown in FIGS. 2A and 2B, when the hold-down portion is securely mounted to a board.

According to some embodiments, portions of a hold-down device 46, 48 may interlock with base regions 24, 26 of a binding, such as with a snap fit type connection. By way of example, the grooves 70 of the hold-down device of FIGS. 3-6B may receive and interlock with corresponding protrusions 71 of the binding base regions to accurately and/or securely position the binding base with respect to the hold-down device. In some embodiments, the groove may be on the base regions of the binding while corresponding protrusions are on the hold-down device. The corresponding protrusions may also be a part of a groove on either a binding base or hold-down device. According to some embodiments, the groove and corresponding features may fit together with a slight clearance, with no clearance, or even with a slight interference fit to help accomplish this. First and second portions 46, 48 of a hold-down device 44 may also be configured to resist rotation of engaged binding base regions about an upper surface of a board to help resist parallelogramming. By way of example, each of the first and second portions 46, 48 of the hold-down device of FIGS. 3 and 4 is mounted to the snowboard with a single threaded fastener 78. Absent contact with one another, each of the first and second hold-down portions (and potentially corresponding portions of the binding) may be capable of rotating on the upper surface of the snowboard if the clamping force associated with the threaded fastener is overcome. Surfaces of the hinge 76, however, abut one another to resist such rotation. In other embodiments, first and second hold-down portions that are independent from one another (e.g., not connected to one another) may include surfaces that abut one another to resist rotation. According to some embodiments, these surfaces may merely be positioned adjacent to one another, such that contact occurs between the surfaces to resist further rotation after some initial amount of rotation has occurred, such as up to 1 degree of rotation or greater, 2 degrees or rotation or greater, or 5 degrees of rotation or greater, among other angles. In other embodiments, each hold-down portion may be secured to a board with multiple fasteners to resist rotation about an upper board surface.

Embodiments of the binding base and/or hold-down device may include one or more rotation stops 80 to limit a range of angular positions in which the binding base may be mounted to a snowboard. Limiting the range of angular positions may help ensure a minimum amount of engagement between the binding and hold-down device, consequently ensuring a secure mounting of the binding to a snowboard. As shown in FIG. 4, the stop may include a pair of shoulders on each of the first and second portions of the hold-down device. A first shoulder or protrusion of each pair may engage a corresponding stop (such as a shoulder or protrusion) on the binding to prevent rotation beyond a particular angle in the clockwise direction. A second shoulder or protrusion of each pair may contact a corresponding stop on the binding to limit rotation in the counter clockwise direction. In other embodiments, a stop may be positioned on only one of the first and second hold-down portions and corresponding regions of the binding, while other embodiments may lack stops altogether. It is also to be appreciated that the stop may be integral to a binding base and/or to a hold down device, and may be separate from fastening hardware of a snowboard binding.

Figure 7:
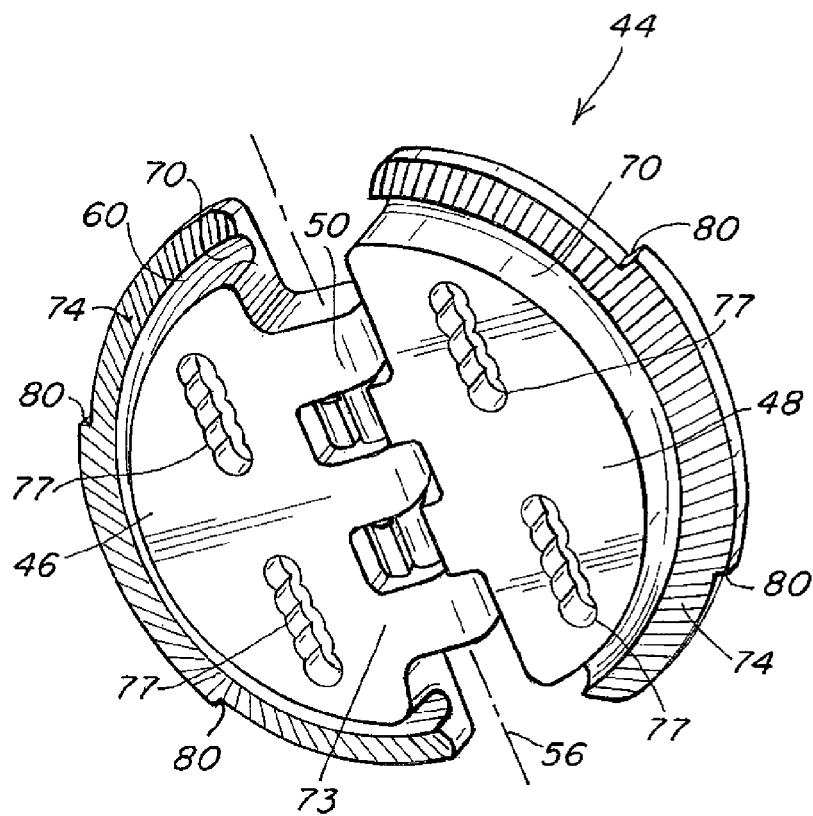
FIG. 7 is a perspective view of a hold-down device, according to one embodiment, configured for use with a snowboard having a 4×4 insert pattern.
Figure 8:
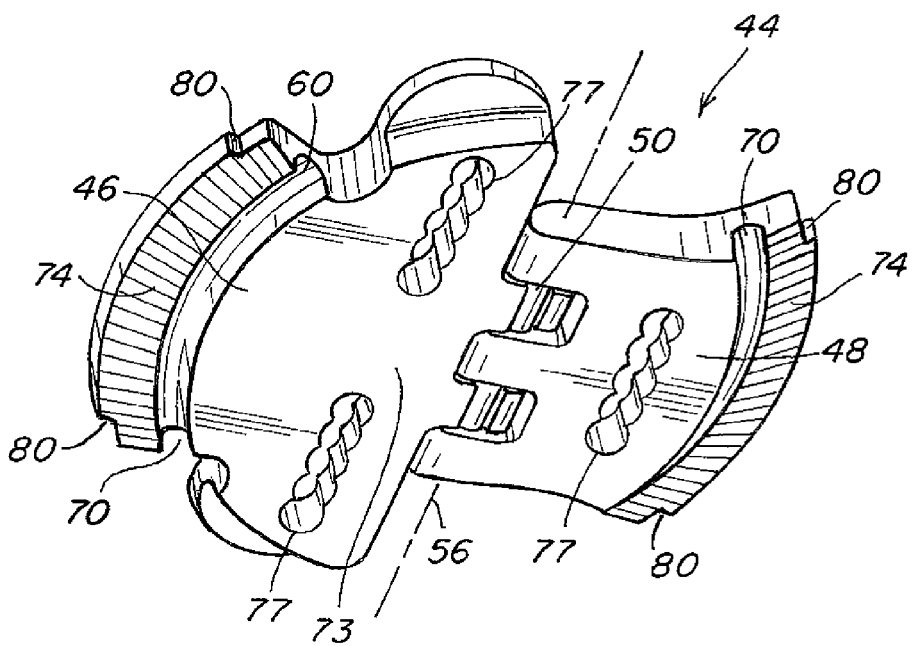
FIG. 8 is a perspective view of a hold-down device, according to one embodiment, configured for use with a snowboard having a 3D (TRADEMARK) insert pattern.

Embodiments of the binding may be compatible with a wide variety of snowboard binding mounting systems. The hold-down device shown in FIGS. 3-6B is configured to mount the binding to a snowboard arranged with the ICS (TRADEMARK) channel-style binding interface sold by The Burton Corporation. The binding 20 of FIGS. 3-6B, or variants thereof, may also be mounted to snowboards with other types of fastening systems by solely changing out the hold-down device 44. By way of example, the hold-down device 44 shown in FIG. 7 may be used to mount the binding 20 to a snowboard 22 with a 4×4 arrangement of threaded inserts, while the hold-down device of FIG. 8 may be used with a snowboard having a 3D (TRADEMARK) threaded insert pattern. Hold-down devices may be configured to mount bindings to snowboards with other fastening arrangements, or may be compatible with two or more types of fastening arrangements, as aspects of the invention are not limited in this respect.

Figure 9A:
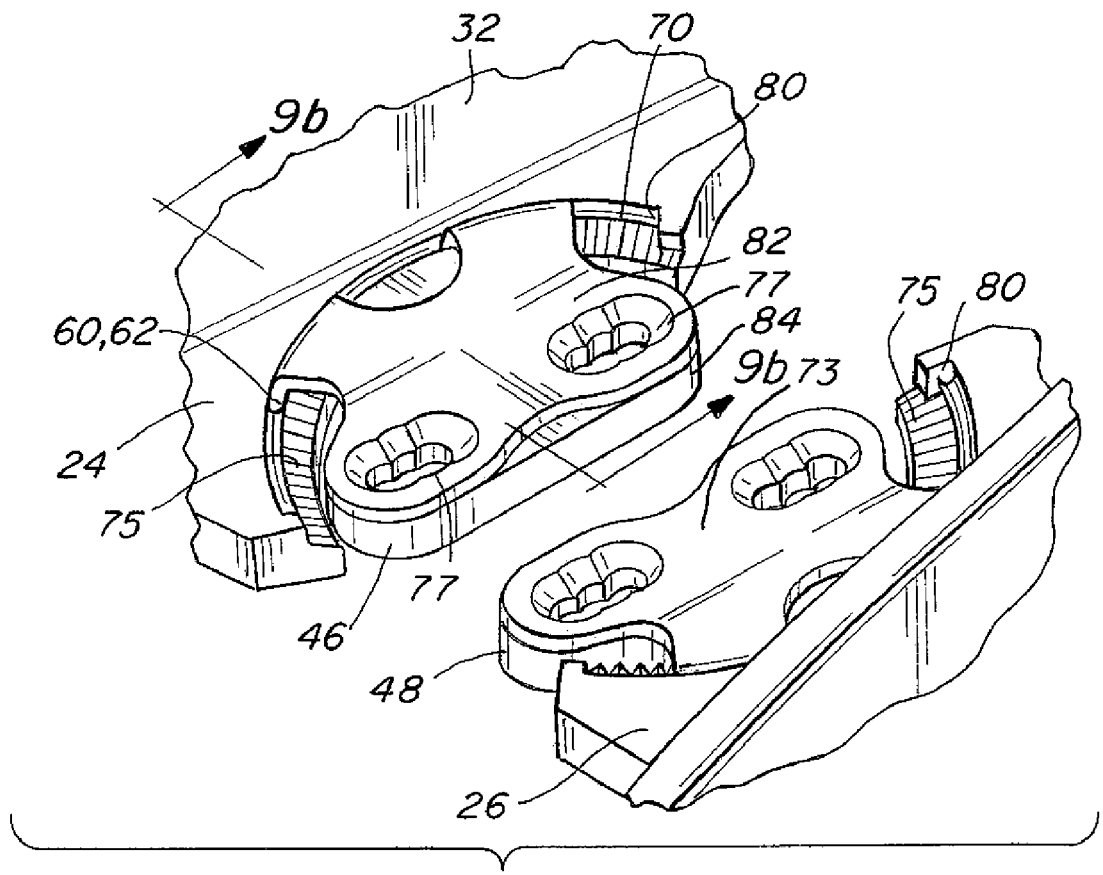
FIG. 9A is perspective view of a hold-down device, according to one embodiment, configured for use with a snowboard having a 4×4 insert pattern.
Figure 9B:
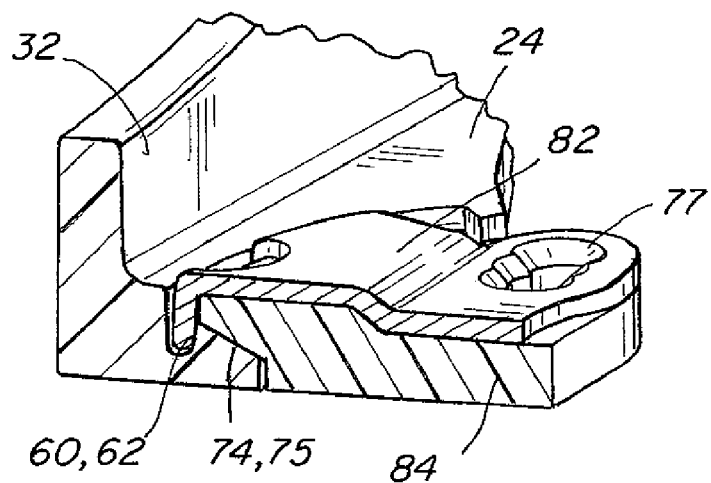
FIG. 9B is a cross-sectional view of the embodiment shown in FIG. 9A, taken along lines 9B-9B of FIG. 9A.

Hold-down devices 44 may be constructed with first and second portions 46, 48 that are independent from one another, as shown in the embodiment of FIGS. 9A and 9B. In such embodiments, the first and second portions may be free to move relative to one another by virtue of lacking a direct physical connection. According to other embodiments, hold-down devices may include more than two independent portions, as aspects of the invention are not limited to having only a first hold-down portion and a second hold-down portion.

Each hold-down portion shown in FIGS. 9A and 9B includes a clamping plate 82 and a positioning plate 84 that is separate from the clamping plate. The positioning plate, as illustrated, includes a plurality of teeth 74 that engage and orient the binding 20 rotationally relative to the hold-down device 44. To mount a binding to a snowboard, the clamping plate 82 is positioned over the positioning plate 84 and portions of the binding. Threaded fasteners pass through holes 77 in the clamping plate and positioning plate and are tightened to secure the clamping plate and positioning plate to the binding and the upper surface of the snowboard. The clamping plate also includes engagement features that face away from an outer edge of the hold-down device to resist binding distortion.

Figure 10A:
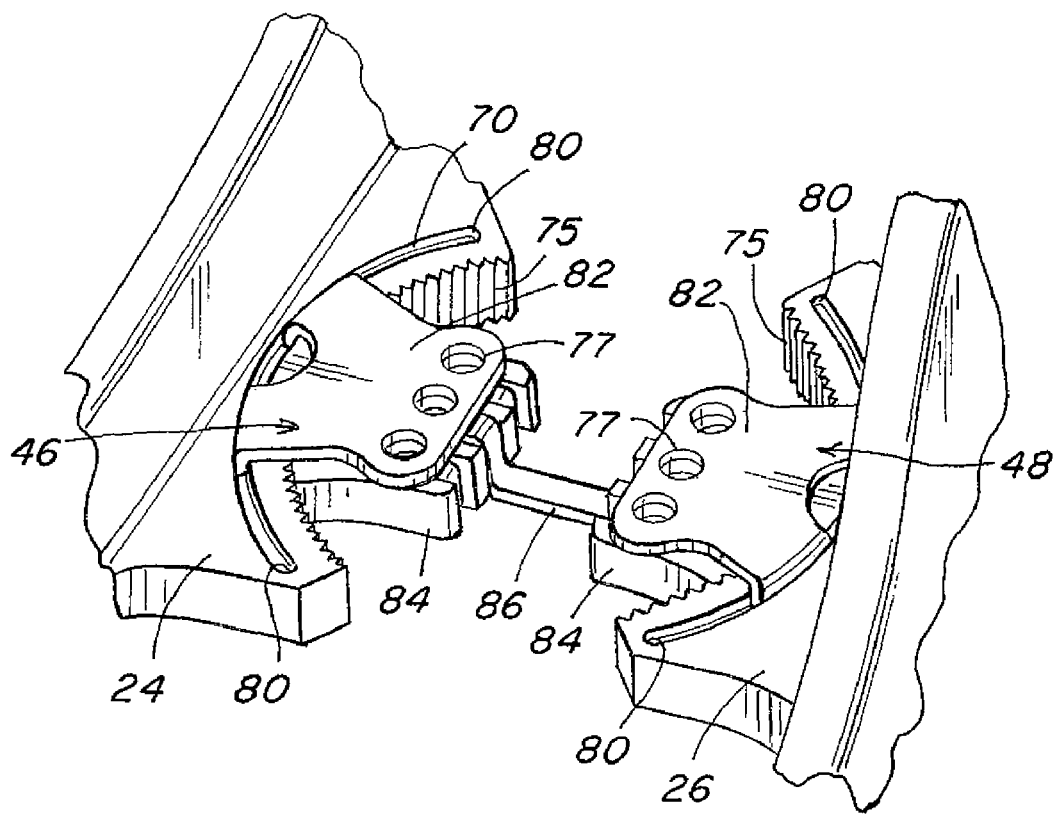
FIG. 10A is a perspective view of a hold-down device, according to one embodiment, configured for use with a snowboard having a channel-type binding interface.
Figure 10B:
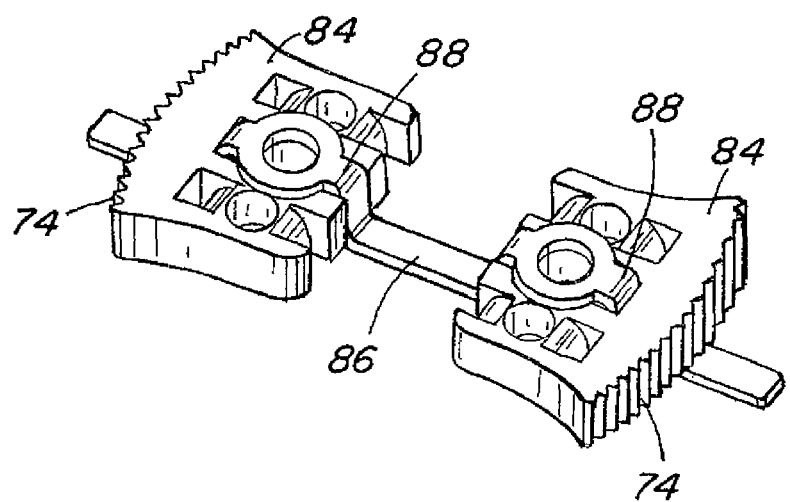
FIG. 10B is a perspective view of the hold-down device shown in FIG. 10A, with the clamping plate removed.

FIGS. 10A and 10B show an alternate embodiment of a hold-down device that is configured to mount a binding 20 to a snowboard 22 having a channel-type binding mount system, such as is shown in FIG. 3. The illustrated embodiment includes first and second portions 46, 48 that each has a clamping plate 82 and a positioning plate 84, like the embodiment of FIGS. 9A and 9B. Each of the first and second portions is connected to the other by a key 86. The key 86 allows the portions 46, 48 to flex relative to one another about a heel-toe axis perpendicular to the key.

The key 86 shown in FIGS. 10A and 10B may help position first and second portions 46, 48 of the hold-down device 44. By way of example, the key 86 may hold each of the first and second portions apart from one another at a fixed distance, preventing the positioning plates 84 from moving toward one another and thus away from corresponding portions of a binding. This is accomplished in the embodiment of FIGS. 10A and 10B by the bend 88 in the key that is threaded through each portion 46, 48, as shown in FIG. 10B. The key of FIGS. 10A and 10B may, additionally or alternatively, extend downward so as to fit into the channel 90 of a snowboard 22 and interact with edges of the channel. Interaction between the key 86 and edges of the channel 90 may resist the key from rotating about an axis that extends upward from a top surface of the snowboard. The key may, in turn, limit each of the first and second portions of the hold-down device from rotating about the upper surface through interaction between the portions of the bends and the key. This interaction should resist parallelogramming. In other embodiments, a two part key (one part associated with each of the first and second portions) may alternatively be used.

Embodiments of the hold-down devices may be constructed of different materials, including but not limited to steel, aluminum, plastics, composite materials, and others. The embodiments of FIGS. 3-5, 6, 7, and 8 may be particularly suitable for plastic constructions, including fiber reinforced plastic constructions. The embodiments of FIGS. 9A-9B and 10A-10B may be suitably constructed with plastic positioning plates and metal clamping plates and a metal key. It is to be appreciated, however, that other materials may be used and are also contemplated.

Figure 11A:
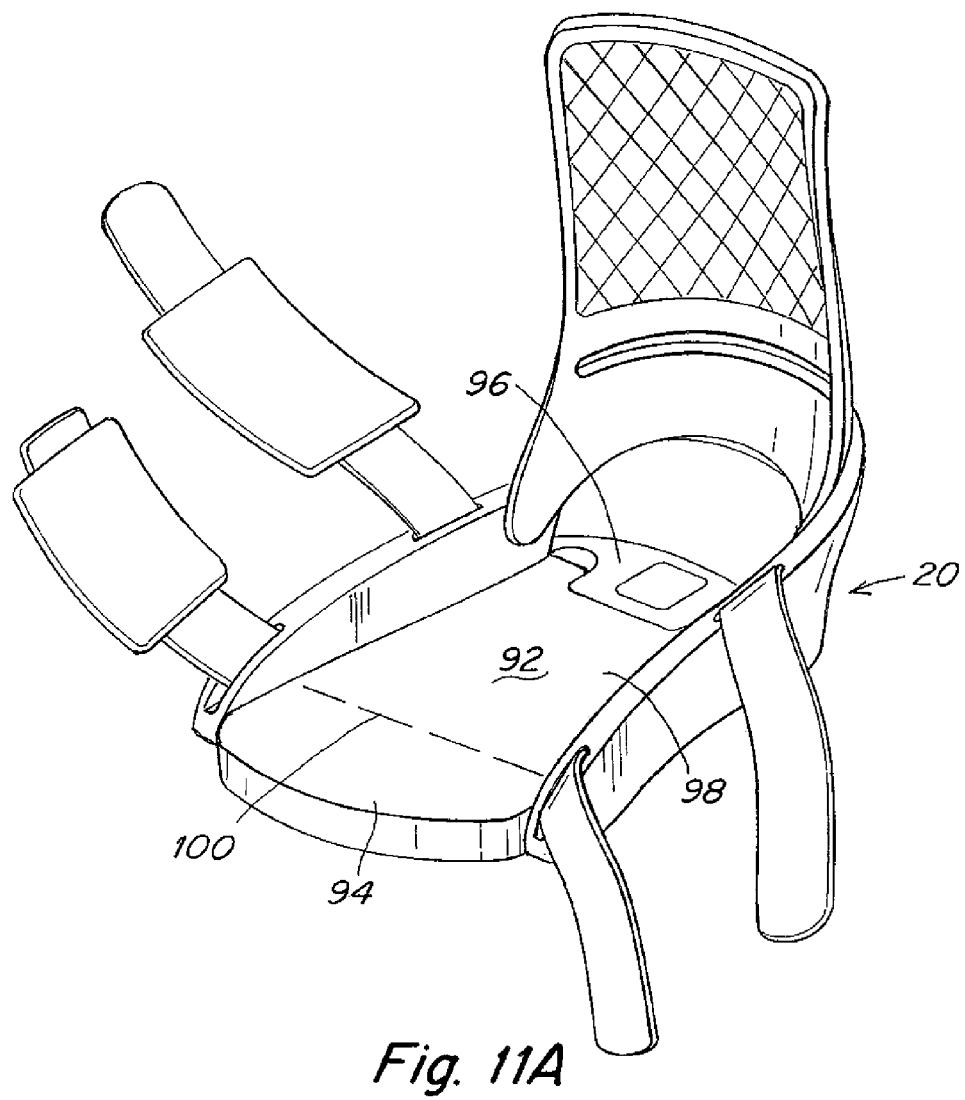
FIG. 11A is a perspective view of the binding of FIG. 1 including a footbed, a highback, and binding straps.
Figure 11B:
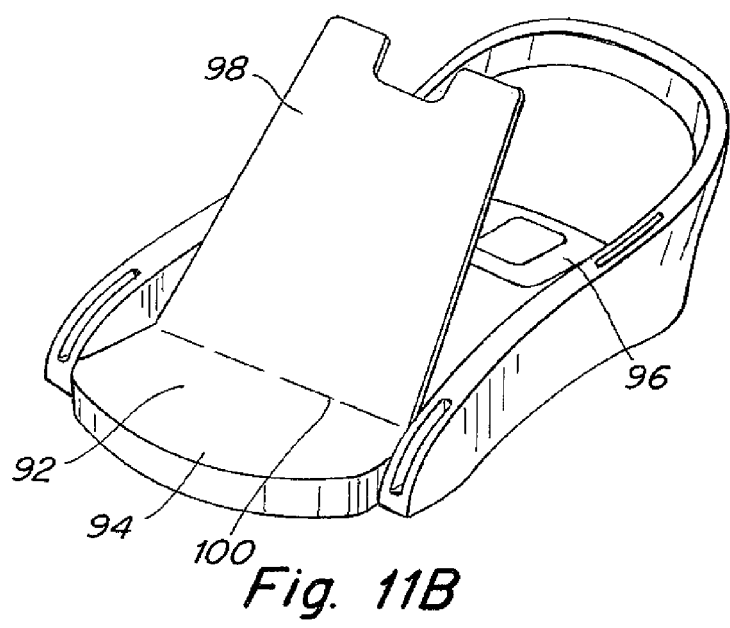
FIG. 11B is a perspective view of the binding of FIG. 11A, showing the footbed positioned to provide access to a hold-down device (highback and binding straps not shown).

A footbed 92 may be positioned over the medial and lateral base portions 36, 38 to provide a surface to receive a rider's boot. One embodiment of a footbed is shown in FIGS. 11A and 11B. As shown, the footbed 92 includes a ramped toe support 94 and a heel support 96 that each mate to the binding 20. The footbed 92 also includes a central portion 98 that overlies the hold-down device 44 and the medial and lateral base portions 36, 38 of the binding.

The central portion 98 of the footbed may be lifted away from the binding to provide access to the base portions of the binding to receive a hold-down device 44 when the binding is mounted or removed from a snowboard or when the binding position is adjusted. As shown in FIG. 11A, the central portion 98 is connected to the ramped toe support 94 by a living hinge 100, although other types of connections are also possible. This hinge allows the central portion to be pivoted upwards, while remaining connected to the binding.

A footbed may be connected to bindings in different ways. In the embodiment of FIGS. 11A and 11B, the ramped toe support 94 of the footbed 92 is fastened to the bridge 52 that connects toe ends of the binding medial and lateral regions. The heel support 96 includes clips that are received in grooves at the heel end of the binding. It is to be appreciated that other connections are contemplated.

EXAMPLES

Tests were performed to characterize the affect on board flex of a binding constructed according to embodiments of the invention. The tests were performed on an EST (TRADEMARK) baseless binding for use with a channel mounting system generally like that represented in US Patent Application Publication US 2008/0030000 A1, a binding constructed generally as represented in FIG. 3 including a hinged hold-down device, and a TRIAD (TRADEMARK) conventional tray style binding including a conventional hold-down disc.

Each of the bindings was constructed from a common material (a plastic formed through a selective laser sintering (SLS) prototyping process) and were of a medium size constructed for a rider's right foot. A 2009 Hero (TRADEMARK) snowboard with a channel mounting system was used for each test. A fourth test was performed on the snowboard without a binding for purposes of comparison.

Table 1 shows the results of a three-point bend test. A board/binding assembly was supported on two points lying outside of the medial and lateral sides of the binding and separated from one another by a span of 480 mm. A tensile/compression testing machine was used to deflect a third point of the board/binding assembly, positioned in the foot receiving area of the binding, downward by a distance of 40 mm. The amount of force required to achieve 40 mm deflection was recorded for each board/binding assembly, and is shown in TABLE 1 below. The three-point bending test was also performed on a board without a binding. As can be seen from the test results, less force is required to bend a board bearing a binding with a hinged hold-down device (Test 2) as compared to a conventional tray binding (Test 3).

TABLE 1

| Test # | Board/Binding | Load, N |
|---|---|---|
| 1 | 2009 Hero 158 with Chanel/2010 Cartel EST (baseless binding without hold-down device in foot receiving area) | 3576 |
| 2 | 2009 Hero 158 with Chanel/binding as shown in FIG. 3 including a hinged hold-down device | 3706 |
| 3 | 2009 Hero 158 with Chanel/2010 Triad (tray style binding with a conventional hold-down disc) | 3831 |
| 4 | 2009 Hero 158 with Chanel/no binding | 3196 |

Table 2, below, shows the change in load and percent change in stiffness associated with each of the binding/board combinations (tests 1-3 of Table 1) after having subtracted the stiffness of the board alone (test 4 of Table 1). Table 2 also shows the percent increase in stiffness associated with each binding, relative to the hoard alone. (The binding with the hinged hold down disc (Test 2) was less stiff than the conventional binding (Test 3).

TABLE 2

| Test # | Binding | $\Delta Load_{binding}$, N | % inc in stiffness |
|---|---|---|---|
| 1 | Cartel EST (baseless binding without a hold-down device in foot receiving area) | 380 | 12 |
| 2 | Binding as shown in FIG. 3 including a hinged hold-down device | 510 | 16 |
| 3 | Triad (tray style binding with conventional hold-down disc) | 635 | 20 |

A second test was performed to determine the stiffness of each of the bindings described above with respect to Table 1, exclusive of board flex characteristics. Each binding was mounted to a snowboard split into two pieces in the edge-to-edge direction is beneath the binding mount surface. The split board/binding assemblies were supported on two rollers lying outside of the medial and lateral sides of the binding and separated from one another by a span of 135 mm. A tensile/compression testing machine was used to deflect a third point of the split board/binding assembly, centered in the foot-receiving area of the binding, with a 300 N force, where deflection and stiffness of the split board/binding were recorded. Table 3 below shows the results of this testing.

Here, again, the binding with a hinged-hold down device was less stiff than the conventional tray binding.

TABLE 3

| Test # | Binding | Deflection, mm | Stiffness, N/mm |
|---|---|---|---|
| 1 | Cartel EST (baseless binding without a hold-down device in foot receiving area) | 16.0 | 21.3 |
| 2 | Binding as shown in FIG. 3 including a hinged hold-down device | 10.6 | 49.0 |
| 3 | Triad (tray style binding with conventional hold-down disc) | 2.7 | 172.5 |

It should be understood that aspects of the invention are described herein with reference to the figures, which show illustrative embodiments in accordance with aspects of the invention. The illustrative embodiments described herein are not necessarily intended to show all aspects of the invention, but rather are used to describe a few illustrative embodiments. For example, although aspects of the invention are described above with reference to a snowboard binding used in conjunction with a snowboard, aspects of the invention may be used with any suitable gliding board and corresponding binding, including wakeboards, skis, and the like. Thus, aspects of the invention are not intended to be construed narrowly in view of the illustrative embodiments. In addition, it should be understood that aspects of the invention may be used alone or in any suitable combination with other aspects of the invention.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A hold-down device for mounting a binding base to a gliding board, comprising:
a first rigid hold-down portion that is arranged to engage with a complimentary hold-down portion receiving area of a first side of a binding base to secure the binding base to a gliding board;
a second rigid hold-down portion that is arranged to engage with a complimentary hold-down portion receiving area of a second side of a binding base to secure the binding base to the gliding board; and
a hinge connection between said first rigid hold-down portion and said second rigid hold-down portion that allows the first and second rigid hold-down portions to be pivoted relative to each other, such that said first rigid hold-down portion and said second rigid hold-down portion are moveable relative to one another in response to bending forces of a gliding board when each of said first and second rigid hold-down portions mount a binding base to a gliding board.

2. The hold-down device of claim 1, wherein said hinge connection includes a pivot axis about which said first rigid hold-down portion and said second rigid hold-down portion are moveable relative to one another.

3. The hold-down device of claim 1, wherein said hinge connection includes a living hinge.

4. The hold-down device of claim 1, wherein each of said first rigid hold-down portion and said second rigid hold-down portion include a curved outer edge.

5. The hold-down device of claim 1, wherein said first rigid hold-down portion and said second rigid hold-down portion form an hourglass shape.

6. The hold-down device of claim 1, further comprising:
a plurality of teeth on each of said first rigid hold-down portion and said second rigid hold-down portion that are engageable with corresponding teeth of a binding base so that a binding base may be arranged relative to said hold down device in one of a plurality of different angular positions.

7. The hold-down device of claim 1, wherein said hinge connection is positioned at a central portion of said hold-down device, said first rigid hold-down portion has a binding base engagement feature for resisting unwanted binding distortion that faces toward said central portion, and said second rigid lateral hold-down portion has a binding base engagement feature for resisting unwanted binding distortion that faces toward said central portion.

8. The hold-down device of claim 7, wherein said first rigid hold-down portion includes a first groove and said second rigid hold-down portion includes a second groove, said first and second binding base engagement features defining in part said respective first and second grooves.

9. The hold-down device of claim 8, wherein said first and second grooves each have an arcuate shape and are arranged to engage with an arcuate protrusion on a binding base.

10. The hold-down device of claim 7, wherein said first and second binding base engagement features are hook-shaped.

11. The hold-down device of claim 8, wherein each of said grooves is defined by a body portion and a lip portion, wherein said body portion extends lower than said lip portion.

12. The hold-down device of claim 1, further comprising:
at least one rotational stop that is cooperable with a rotational stop of a binding base to limit a range of angular positions of a binding base relative to said hold-down device.

13. The hold-down device of claim 1, further including angle indication marks on at least one of said rigid hold-down portions that indicate an orientation of a binding base relative to said hold-down device.

14. The hold-down device of claim 1 further including at least two openings or slots adapted to received fasteners for securing said hold-down device to a gliding board.

15. The hold-down device of claim 1, wherein each rigid hold-down portion includes a body portion, a lip formed in the body portion, at least two openings or slots adapted to receive a fastener for securing said hold-down device to a gliding board located in said body portion, and a plurality of teeth at the lip that are engageable with corresponding teeth of a binding base so that a binding base may be arranged relative to said hold-down device in one of a plurality of different angular positions.

16. The hold-down device of claim 1, in combination with a binding base arranged to engage with the hold-down device for mounting the binding base to a gliding board.

17. The hold-down device of claim 16, wherein said binding base is a snowboard binding base.

18. The hold-down device of claim 1, in combination with a gliding board.

19. The hold-down device of claim 18, wherein said gliding board is a snowboard.

20. The hold-down device of claim 1, in combination with a binding base comprising:

a medial sidewall and a lateral sidewall, a medial base portion and a lateral base portion, each of said medial base portion and said lateral base portion positioned between said medial sidewall and said lateral sidewall and together defining the hold-down portion receiving area.

21. A hold-down device for mounting a binding base to a gliding board, comprising:

a first rigid hold-down portion that is arranged to engage with an inner medial side of a binding base and that includes at least one first opening or slot arranged to receive a fastener to mount said first rigid hold-down portion and an engaged medial side of a binding base to a gliding board;

a second rigid hold-down portion that is arranged to engage with an inner lateral side of a binding base and that includes at least one second opening or slot arranged to receive a fastener to mount said second rigid hold-down portion and an engaged lateral side of a binding base to a gliding board;

a plurality of teeth extending along an arc on each of said first rigid hold-down portion and said second rigid hold-down portion that are engageable to corresponding teeth of an inner medial side and an inner lateral side, respectively, of a binding base in one of a plurality of different angular positions; and a hinge connection between said first rigid hold-down portion and said second rigid hold-down portion that allows the first and second rigid hold-down portions to be pivoted relative to each other such that, when said hold-down device has mounted a binding base to a gliding board, said first rigid hold-down portion and said second rigid hold-down portion are moveable relative to one another in response to bending forces of the gliding board.

22. The device of claim 21, wherein the first rigid hold-down portion includes a first binding base engagement feature including a groove or projection for engagement with the inner medial side of the binding base and resisting binding distortion and movement of the medial side of the binding base away from the first rigid hold-down portion; and the second rigid hold-down portion including a second binding base engagement feature including a groove or projection for engagement with the lateral side of the binding base and resisting binding distortion and movement of the lateral side of the binding base away from the second rigid hold-down portion.

* * * * *

UNITED STATES PATENT AND TRADEMARK OFFICE
CERTIFICATE OF CORRECTION

| | | |
|---|---|---|
| PATENT NO. | : 8,167,321 B2 | Page 1 of 1 |
| APPLICATION NO. | : 12/327794 | |
| DATED | : May 1, 2012 | |
| INVENTOR(S) | : Christopher C. Cunningham et al. | |

It is certified that error appears in the above-identified patent and that said Letters Patent is hereby corrected as shown below:

Column 1, at line 41, should read:
Aspects of the invention relate to a binding, that when...

Column 2, at line 8, should read:
According to another aspect, a hold-down device is pro-...

Column 7, at line 48, should read:
...ment of FIGS. 3-6B), when mounted thereto. An arcuate...

Column 12, at line 40, should read:
...binding relative to the board alone. (The binding with the...

Signed and Sealed this
Twenty-sixth Day of June, 2012

David J. Kappos
*Director of the United States Patent and Trademark Office*